United States Patent
Lee et al.

(10) Patent No.: US 10,859,011 B2
(45) Date of Patent: Dec. 8, 2020

(54) COMBUSTOR WITH FLOW GUIDE IN DOUBLE PIPE TYPE LINER, AND GAS TURBINE HAVING SAME

(71) Applicant: DOOSAN HEAVY INDUSTRIES & CONSTRUCTION CO., LTD., Changwon-si (KR)

(72) Inventors: Dong Gon Lee, Seoul (KR); U Jin Roh, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 7 days.

(21) Appl. No.: 16/296,176

(22) Filed: Mar. 7, 2019

(65) Prior Publication Data

US 2019/0301375 A1 Oct. 3, 2019

(30) Foreign Application Priority Data

Mar. 28, 2018 (KR) .......................... 10-2018-0036091

(51) Int. Cl.
*F02C 1/00* (2006.01)
*F02D 21/10* (2006.01)
(Continued)

(52) U.S. Cl.
CPC ................. *F02D 21/10* (2013.01); *F02C 7/22* (2013.01); *F02M 61/1806* (2013.01); *F23R 3/28* (2013.01);
(Continued)

(58) Field of Classification Search
CPC ............ F01D 9/023; F23R 2900/03044; F23R 2900/03043; F23R 2900/03045; F05D 2260/201
See application file for complete search history.

(56) References Cited

U.S. PATENT DOCUMENTS 5,772,400 A * 6/1998 Pellow .................... F01D 11/24
415/173.1
8,919,127 B2 * 12/2014 Melton .................... F23R 3/286
60/755
(Continued)

FOREIGN PATENT DOCUMENTS

| KR | 100753712 B1 | 8/2007 |
| KR | 101254170 B1 | 4/2013 |
| KR | 20160069805 A | 6/2016 |

OTHER PUBLICATIONS

A Korean Office Action dated May 17, 2019 in connection with Korean Patent Application No. 10-2018-0036091 which corresponds to the above-referenced U.S. application.

(Continued)

*Primary Examiner* — Gerald L Sung
(74) *Attorney, Agent, or Firm* — INVENSTONE Patent, LLC

(57) ABSTRACT

A combustor includes a flow guide installed in an air channel to simultaneously implement collision cooling and convection cooling of a combustor liner and a transition piece. The air channel is formed by an inner casing and an outer casing which are spaced apart from each other by a predetermined distance, through which combustion air is introduced to the combustor in order to produce a fuel-air mixture. The flow guide is attached to an inner surface of the outer casing and extending a predetermined length towards the inner casing so as to guide the combustion air flowing through the air channel toward a surface of the inner casing. The flow guide includes a channel inlet formed on an upstream side; a channel outlet formed on a lower surface facing the inner casing; and a guide channel communicating with each of the channel inlet and the channel outlet.

13 Claims, 11 Drawing Sheets

(51) Int. Cl.
*F23R 3/28* (2006.01)
*F02C 7/22* (2006.01)
*F02M 61/18* (2006.01)
*F01D 9/02* (2006.01)

(52) U.S. Cl.
CPC ......... *F01D 9/023* (2013.01); *F02M 2200/06* (2013.01); *F23R 2900/03043* (2013.01)

(56) References Cited

U.S. PATENT DOCUMENTS

| | | | | |
|---|---|---|---|---|
| 2004/0139746 A1* | 7/2004 | Soechting | ............... | F01D 9/023 60/752 |
| 2008/0166220 A1* | 7/2008 | Chen | ............... | F01D 9/023 415/115 |
| 2008/0271458 A1* | 11/2008 | Ekkad | ............... | F23R 3/06 60/755 |
| 2010/0000200 A1* | 1/2010 | Smith | ............... | F01D 5/186 60/266 |
| 2010/0031665 A1* | 2/2010 | Chokshi | ............... | F23R 3/54 60/760 |
| 2010/0071382 A1* | 3/2010 | Liang | ............... | F23R 3/06 60/806 |
| 2011/0214429 A1* | 9/2011 | Chen | ............... | F23R 3/04 60/755 |
| 2012/0114868 A1* | 5/2012 | Bunker | ............... | B23P 15/04 427/448 |
| 2012/0198855 A1* | 8/2012 | Cihlar | ............... | F01D 25/12 60/760 |
| 2013/0333388 A1* | 12/2013 | Polisetty | ............... | F23R 3/002 60/752 |
| 2014/0096528 A1 | 4/2014 | Cunha et al. | | |
| 2014/0116058 A1* | 5/2014 | Chen | ............... | F23R 3/002 60/754 |
| 2014/0294560 A1* | 10/2014 | Mishra | ............... | F01D 11/24 415/1 |
| 2016/0356177 A1* | 12/2016 | Hagan | ............... | F01D 9/02 |
| 2019/0128524 A1* | 5/2019 | Lee | ............... | F23R 3/04 |

OTHER PUBLICATIONS

English Translation of KR Office Action dated May 17, 2019 in connection with Korean Patent Application No. 10-2018-0036091 which corresponds to the above-referenced U.S. application.

\* cited by examiner

COMBUSTOR WITH FLOW GUIDE IN DOUBLE PIPE TYPE LINER, AND GAS TURBINE HAVING SAME

CROSS REFERENCE TO RELATED APPLICATIONS

The present application claims priority to Korean Patent Application No. 10-2018-0036091, filed on Mar. 28, 2018, the entire contents of which are incorporated herein for all purposes by this reference.

BACKGROUND OF THE INVENTION

1. Field of the Invention

The present invention relates to a combustor, and a gas turbine having the same.

2. Description of the Background Art

An ideal thermodynamic cycle of a gas turbine follows a Brayton cycle. The Brayton cycle consists of four thermodynamic processes: an isentropic compression (adiabatic compression), an isobaric combustion, an isentropic expansion (adiabatic expansion), and isobaric heat rejection. That is, in the Brayton cycle, atmospheric air is sucked and compressed into high pressure air, a mixture of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

A gas turbine for realizing the Brayton cycle includes a compressor, combustor, and a turbine. FIG. 1 illustrates the overall structure of a gas turbine 1000. Although the present invention will be described with reference to FIG. 1, the present invention may be widely applied to other turbine engines which are similar that shown in FIG. 1.

The compressor 1100 of the gas turbine 1000 is a unit that sucks and compresses air. The compressor mainly serves to supply compressed air for combustion to a combustor 1200 and to supply compressed air for cooling to high temperature regions of the gas turbine 1000. Since the sucked air undergoes an adiabatic compression process in the compressor 1100, the air passing through the compressor 1100 has increased pressure and temperature.

The compressor 1100 is typically designed as a centrifugal compressor or an axial compressor, wherein the centrifugal compressor is generally applied to a small-scale gas turbine. On the other hand, a multi-stage axial compressor may be applied to a large-scale gas turbine, such as the gas turbine 1000, which is necessary to compress a large amount of air. A rotary shaft of the compressor 1100 and a rotary shaft of the turbine 1300 are directly connected to each other so that the compressor 1100 can be driven using part of the power output from the turbine 1300.

The combustor 1200 serves to mix fuel into the compressed air supplied from an outlet of the compressor 1100 and to combust the mixture at constant pressure to produce hot combustion gases. FIG. 2 illustrates an example of the combustor 1200 provided in the gas turbine 1000. The combustor 1200 is disposed downstream of the compressor 1100 and includes a plurality of burners 1220 each disposed inside a combustor casing 1210. Each burner 1220 has several combustion nozzles 1230, through which fuel is sprayed into and mixed with air in a proper ratio to form a fuel-air mixture suitable for combustion.

Since the combustor 1200 has the highest temperature environment in the gas turbine 1000, the combustor needs suitable cooling. Referring to FIG. 2, compressed air flows along a flow path towards the combustion nozzle 1230 along an outer surface of a duct assembly, the downstream side of which is surrounded by a flow sleeve 1270. Hot combustion gas flows through the duct assembly, which includes a liner and a transition piece 1260 and connects the burner 1220 and the turbine 1300. The duct assembly heated by the hot combustion gas is cooled by the compressed air flowing along the flow path towards the combustion nozzle 1230.

More specifically, as shown in FIG. 2, the combustor 1200 includes an inner casing 1250 and an outer casing 1210 which are spaced apart from each other by a predetermined distance to form an air channel 1211, through which air is introduced to the combustor. Fuel is mixed with the introduced air to generate a fuel-air mixture, which is then injected into a combustion chamber 1240 through a central nozzle 1230 and main nozzles 1231.

The central nozzle 1230 is centrally installed with respect to the inner casing 1250 in the axial direction of the combustor, and the main nozzles 1231 are disposed inside the inner casing 1250 so as to surround the central nozzle 1230.

Since the combustor liner and the transition piece constituted by the inner casing and the outer casing enclose high temperature combustion air, cooling is essential for securing the structural integrity.

Impact cooling and convection cooling are the main cooling methods for cooling the combustor liner and transition piece, and local pins are used to improve cooling performance. It is necessary to improve the cooling performance according to the operation of the combustor while maintaining the existing shape. Local hot spot cooling is also required.

Accordingly, there is a need for a technique capable of solving the above-mentioned problems of the related art.

The foregoing is intended merely to aid in the understanding of the background of the present invention, and is not intended to mean that the present invention falls within the purview of the related art that is already known to those skilled in the art.

SUMMARY OF THE INVENTION

Accordingly, it is an object of the present invention to provide a combustor with a flow guide in a double pipe type liner that is capable of simultaneously implementing collision cooling and convection cooling of a combustor liner and a transition piece. It is another object of the present invention to provide a gas turbine having the combustor.

In an aspect of the present invention, a combustor may include an air channel formed by an inner casing and an outer casing which are spaced apart from each other by a predetermined distance, through which combustion air is introduced to the combustor in order to produce a fuel-air mixture; and a flow guide attached to an inner surface of the outer casing and extending a predetermined length towards the inner casing so as to guide the combustion air flowing through the air channel toward a surface of the inner casing.

The flow guide may include a channel inlet formed so as to face in a direction of the combustion air flowing through the air channel; a channel outlet formed on a lower surface of the glow guide facing the inner casing; and a guide channel communicating with each of the channel inlet and the channel outlet.

The guide channel may have a curved shape with a predetermined radius of curvature connecting the channel inlet and the channel outlet with each other.

The c channel outlet may consist of two or more channel outlets respectively communicating with the guide channel.

The channel inlet may consist of two or more channel inlets communicating with the guide channel.

The channel outlet may consist of a plurality of channel outlets, and the channel inlet consists of a plurality of channel inlets; and wherein the plurality of channel outlets and the plurality of channel inlets communicate with each other, respectively.

The lower surface of the flow guide facing the outer surface of the inner casing may have a structure corresponding to an outer surface of the inner casing and is spaced apart from the outer surface of the inner casing by a predetermined distance.

The lower surface of the flow guide facing the outer surface of the inner casing may have a curved structure recessed by a predetermined depth towards the outer casing.

The channel outlet may consist of a plurality of microchannels respectively communicating with the guide channel. The channel outlet may occupy 50 to 90% of the lower surface of the flow guide.

The flow guide may be detachably mounted on the inner surface of the outer casing.

The flow guide may be mounted on the inner surface of the outer casing and may be configured rotate at a predetermined angle about a hinge. The flow guide may have a cross-sectional structure formed as airfoil structure extending in a direction corresponding to a direction of combustion air flowing through the air channel.

The flow guide may have a cross-sectional structure formed as any one of a circular, oval, or airfoil structure extending in a direction corresponding to a direction of combustion air flowing through the air channel. Alternatively, the flow guide may have a cross-sectional structure formed as any one of a triangular, a trapezoidal, or a fan-shaped structure extending in a direction corresponding to a direction of combustion air flowing through the air channel.

In another aspect of the present invention, a combustor may include an air channel formed by an inner casing and an outer casing which are spaced apart from each other by a predetermined distance, through which combustion air is introduced to the combustor in order to produce a fuel-air mixture; a flow guide attached to an inner surface of the outer casing and extending a predetermined length towards the inner casing so as to guide the combustion air flowing through the air channel toward a surface of the inner casing; a channel inlet formed so as to face in a direction of the combustion air flowing through the air channel; and a channel outlet formed on a lower surface of the glow guide facing the inner casing. The channel inlet and the channel outlet may communicate with each other through a guide channel of the flow guide.

In another aspect of the present invention, there is provided a gas turbine including a compressor to compress air introduced from an outside; a combustor to produce combustion gas by combusting a mixture of fuel and the compressed air; and a turbine to produce power using the combustion gas. Here, the combustor of the gas turbine is consistent with the combustor as described above.

DETAILED DESCRIPTION OF THE INVENTION

Hereinafter, exemplary embodiments of the present invention will be described in detail with reference to the accompanying drawings. It should be noted that terms used in this specification and claims should not be limited to a common meaning or a dictionary definition, but should be construed as the meanings and concepts according to technical spirits of the present invention.

It will be understood that when an element is referred to as being "on" another element, it can be directly on the other element or intervening elements may be present therebetween. Further, it will be understood that the term "comprising" or "including" specifies the presence of stated elements, but does not preclude the presence or addition of one or more other elements, unless the context clearly indicates otherwise.

Figure 1:
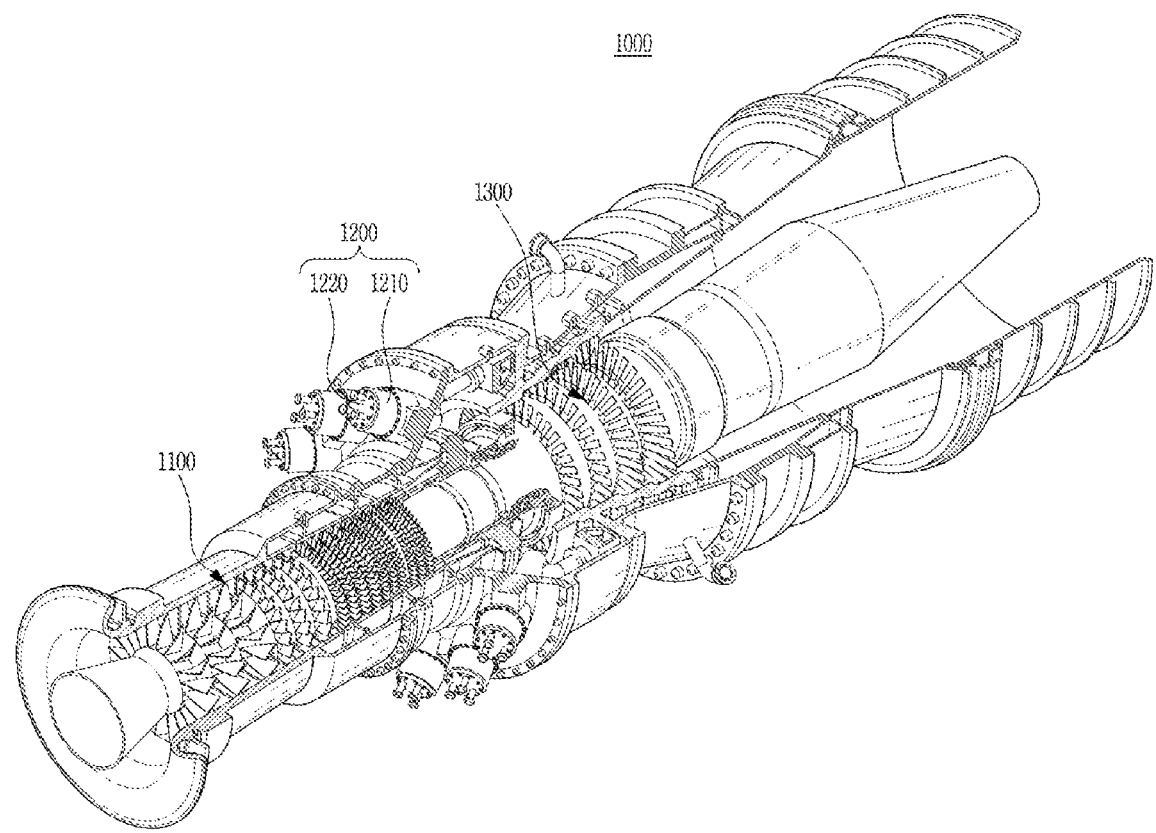
FIG. 1 is a cutaway perspective view of a gas turbine to which may be applied a combustor according to the present invention.
Figure 2:
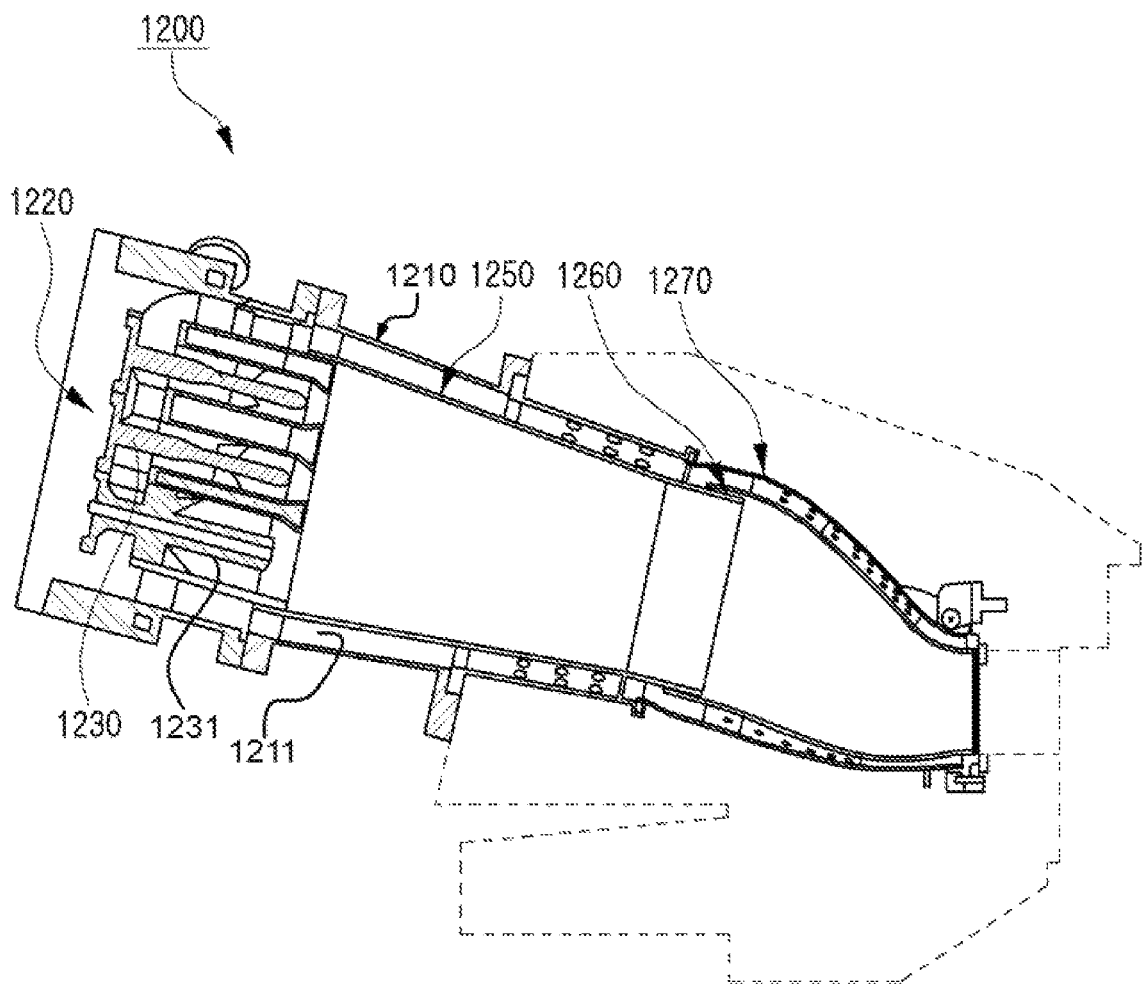
FIG. 2 is a cross-sectional view of a combustor shown in FIG. 1.
Figure 3:
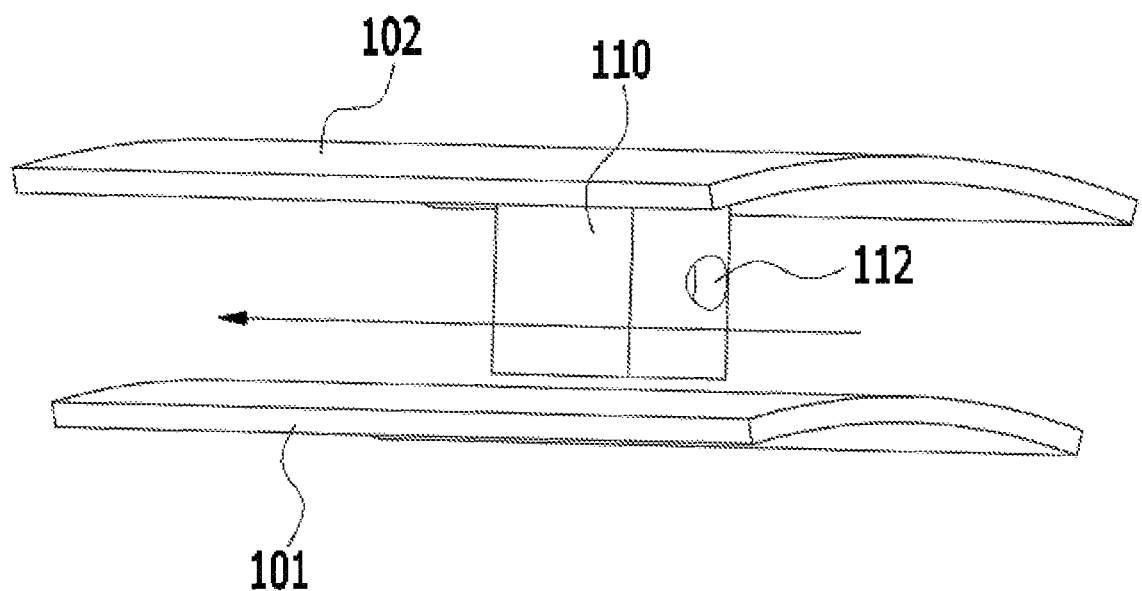
FIG. 3 is a perspective view of a flow guide of a combustor according to the present invention.
Figure 4:
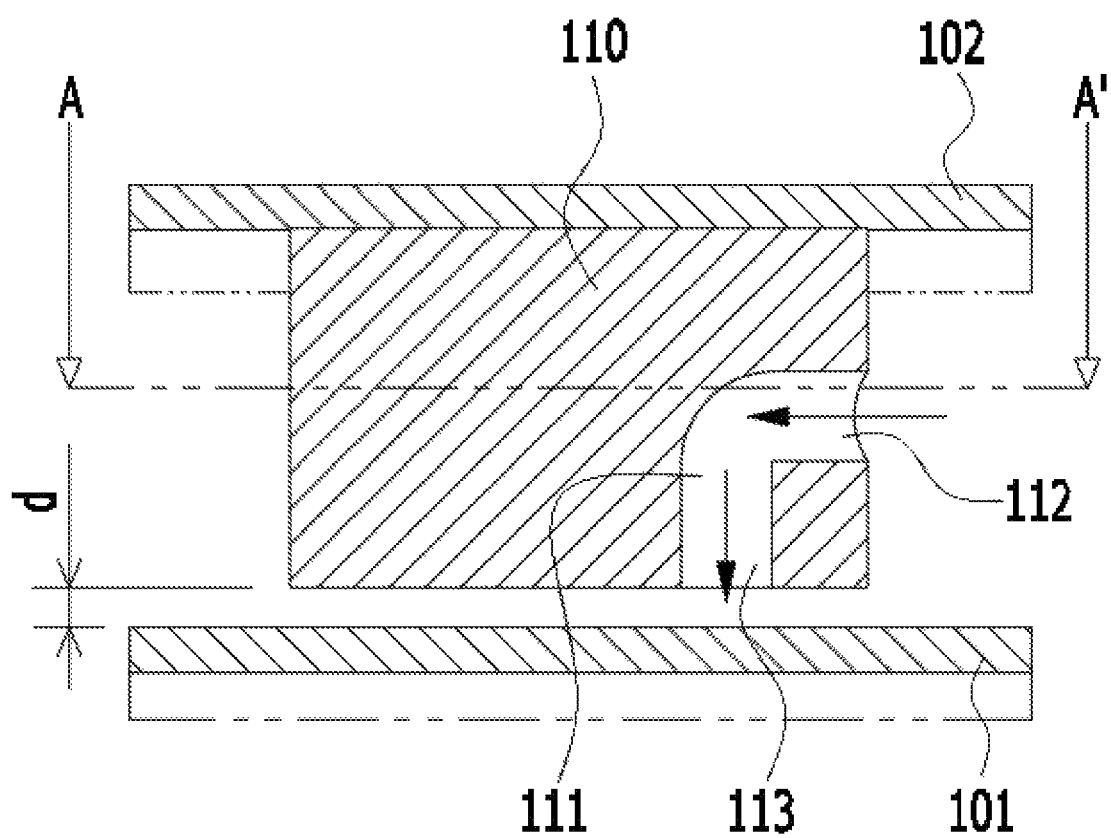
FIG. 4 is a sectional view of the flow guide shown in FIG. 3.
Figure 5:
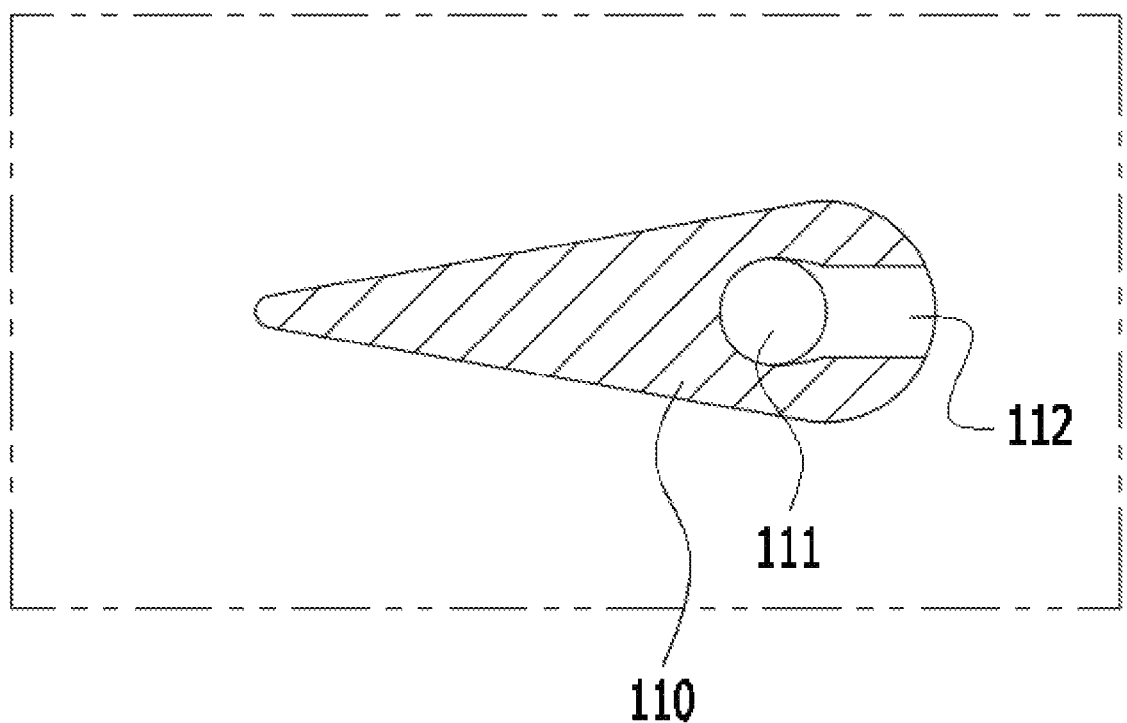
FIG. 5 is a sectional view along line A-A' of FIG. 4.

Referring to FIGS. 3-5, the combustor according to the present embodiment includes an inner casing 101 and an outer casing 102 which are spaced apart from each other by a predetermined distance to form an air channel, through which air is introduced so that fuel is mixed with the introduced air to generate a fuel-air mixture, which is then injected into a combustion chamber through a central nozzle and a main nozzle.

Here, the combustor according to the present embodiment is provided with a flow guide 110 disposed between the inner casing 101 and the outer casing 102. The flow guide 110 is provided with a guide channel 111 having a specific structure capable of simultaneously implementing collision cooling and convection cooling for cooling the combustor liner and the transition piece.

Specifically, the flow guide 110 according to the present embodiment is attached to an inner surface of the outer casing 102 and extends a predetermined length towards the inner casing 102. Here, combustion air flow through the space between the inner casing 101 and the outer casing 102, and the flow guide 110 may guide the flowing combustion air toward the surface of the inner casing 101.

FIG. 5 shows a horizontal cross-section of the flow guide 110 taken along line A-A' of FIG. 4. As illustrated in FIG. 5, the structure of the flow guide 110 has an airfoil shape extending in a direction corresponding to the direction of combustion air flowing through the space between the inner casing 101 and the outer casing 102. The structure of the flow guide 110 may have a circular, oval, or airfoil shape according to the present invention. In some cases, the cross-sectional structure of the flow guide may have a triangular structure, a trapezoidal structure, or a fan-shaped structure similarly extending in the direction of the flowing combustion air. Here, the flow guide 110 has an upstream side and a downstream side according to the direction of the combustion air flowing through the space between the inner casing 101 and the outer casing 102.

As illustrated in FIG. 4, the guide channel 111 of the flow guide 110 may include a channel inlet 112 and a channel outlet 113 communicating with each other. Specifically, the channel inlet 112 is preferably formed on the upstream side of the flow guide 110, so as to face in the direction of the combustion air flowing through the air channel, and the channel outlet 113 is preferably formed on a lower surface of the flow guide 110 facing the inner casing 101. Further, a cross-sectional structure of the flow guide 110 may be differently positioned by specific distance (d) from a surface of the inner casing 101.

Here, as illustrated in FIG. 4, the guide channel 111 may have a curved shape with a predetermined radius of curvature connecting the channel inlet 112 and the channel outlet 113 with each other.

Figure 6:
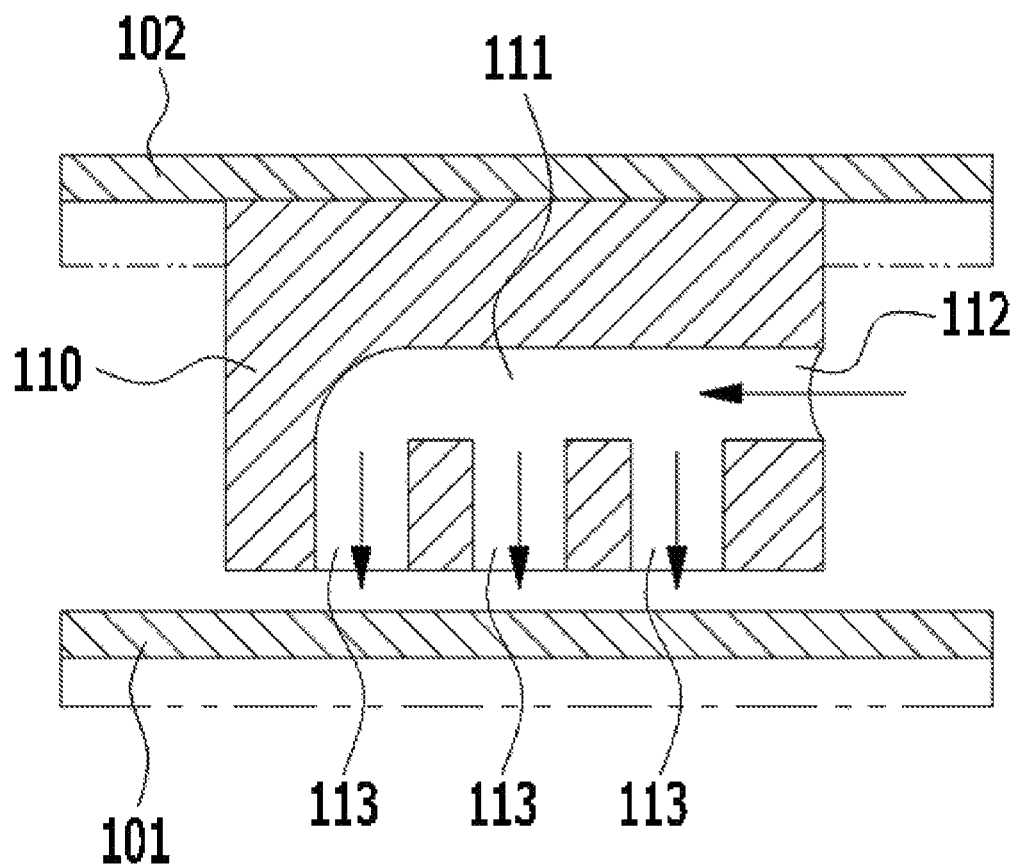
FIG. 6 is a sectional view of a flow guide of a combustor according to another embodiment of the present invention.
Figure 7:
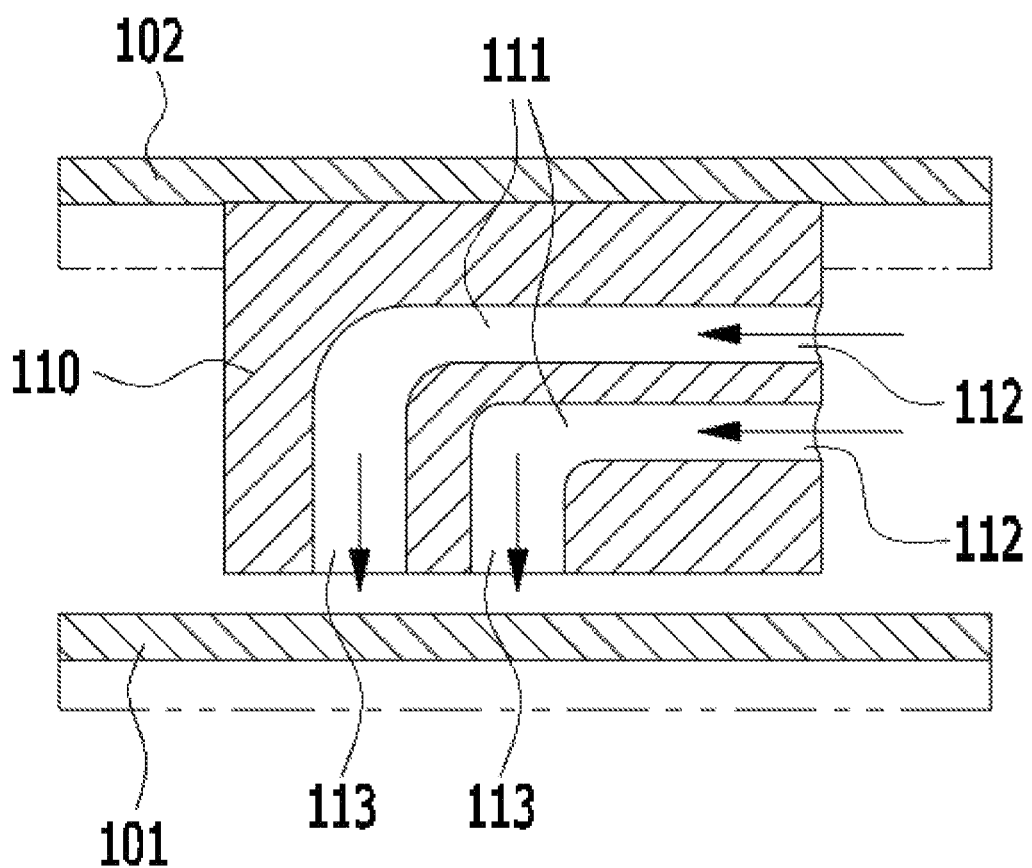
FIG. 7 is a sectional view of a flow guide of a combustor according to another embodiment of the present invention.
Figure 8:
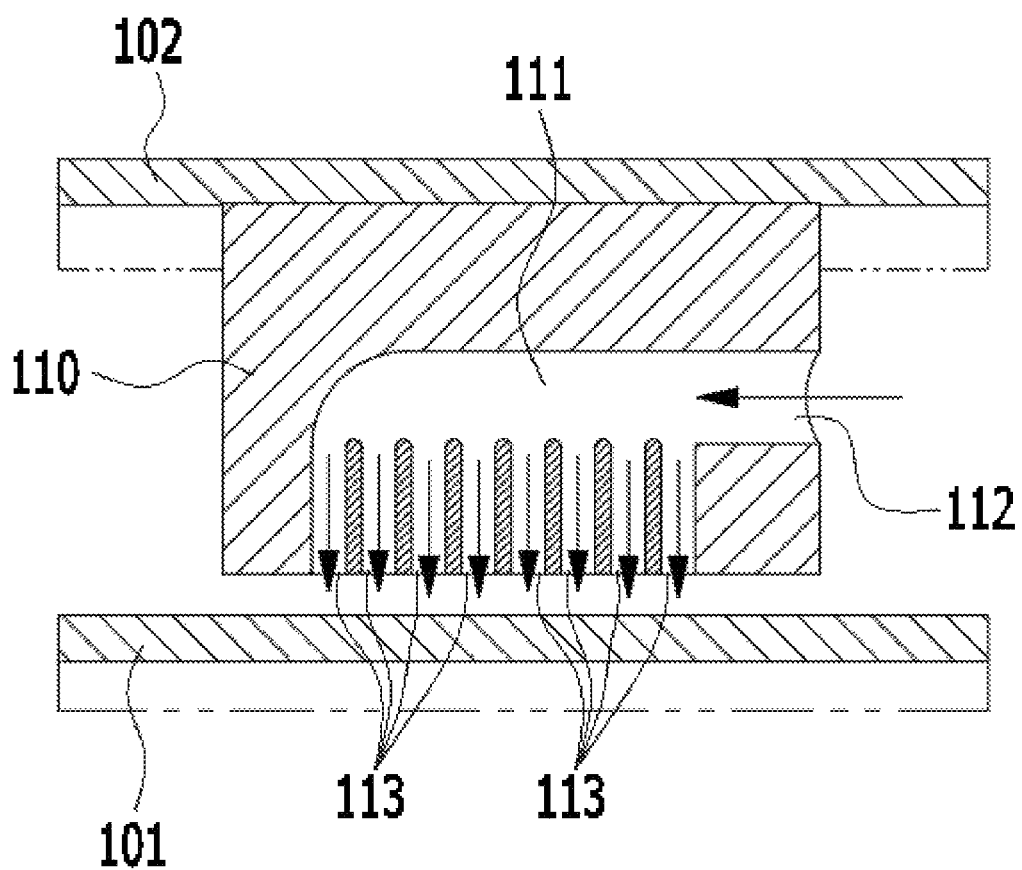
FIG. 8 is a sectional view of a flow guide of a combustor according to another embodiment of the present invention.

FIGS. 6 to 8 respectively illustrate a flow guide according to further embodiments of the present invention.

As illustrated in FIG. 6, the flow guide 110 may have a structure in which two or more channel outlets 113 respectively communicate with the guide channel 111.

In some cases, as illustrated in FIG. 7, the flow guide 110 may have a structure in which a plurality of channel inlets 112 and a plurality of channel outlets 113 respectively communicating with each other. That is, the flow guide 110 may have a structure in which the channel guide 111 consists of two or more channel guides each of which includes a channel inlet 112 and a channel outlet 113 communicating with each other. Alternatively, the flow guide of the present invention may have a structure in which two or more channel inlets 112 respectively communicate with the guide channel 111.

It is preferred that the number and position of the channel inlets 112 and the channel outlets 113 are appropriately selected in consideration of a flow speed and a flow rate of the combustion air flowing through the space between the inner casing 101 and the outer casing 102.

Referring to FIG. 8, the guide channel 111 may include a plurality of micro-channels 114. Here, the channel outlet 113 may consist of the plurality of micro-channels, which respectively communicate with the guide channel 111. At this time, the channel outlet 113 preferably has a large-area structure occupying 50 to 90% of the lower surface of the flow guide 110.

Figure 9:
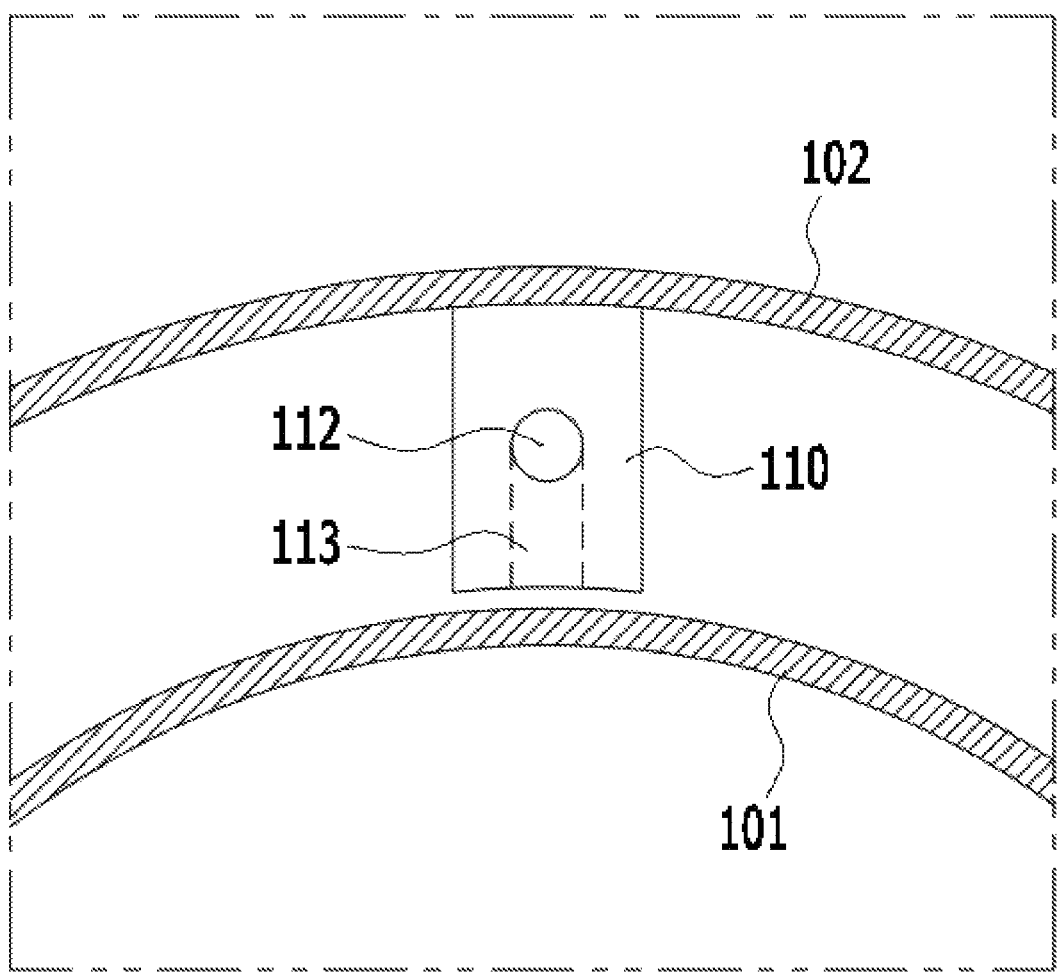
FIG. 9 is a side view of a flow guide of a combustor according to another embodiment of the present invention.
Figure 10:
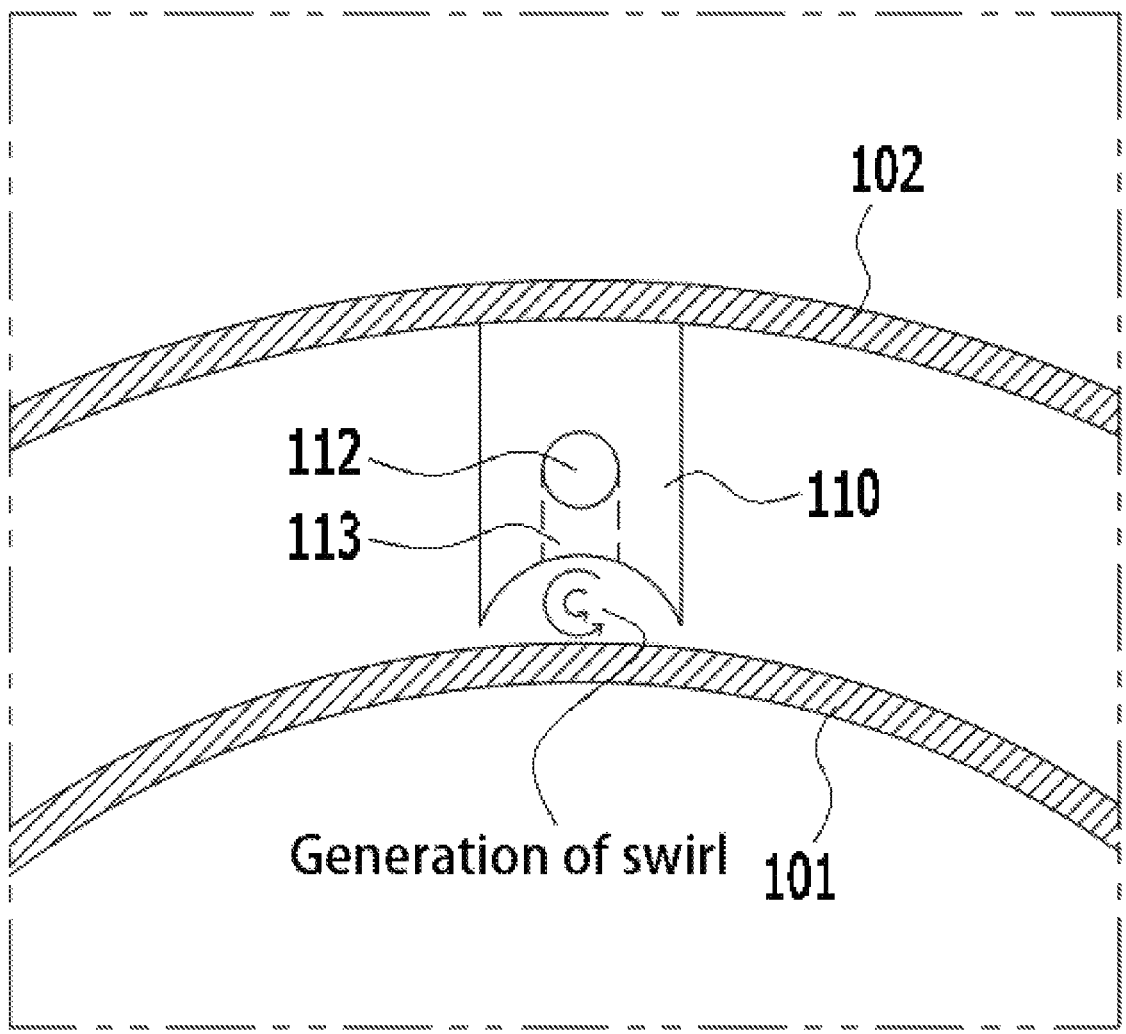
FIG. 10 is a side view of a flow guide of a combustor according to another embodiment of the present invention.

FIGS. 9 and 10 respectively illustrate a flow guide according to other embodiments of the present invention.

Referring to FIGS. 9 and 10, the lower surface of the flow guide 110 has a structure corresponding to the outer surface of the inner casing 101, and may be spaced apart from the outer surface of the inner casing 101 by a predetermined distance.

In some cases, as illustrated in FIG. 10, the lower surface of the flow guide 110 facing the outer surface of the inner casing 101 may have a curved structure recessed by a predetermined depth towards the outer casing 102.

In this case, air introduced through the channel inlet 112 is injected onto the outer surface of the inner casing 101 through the channel outlet 113. At this time, swirl may be generated along the curved structure when the injected air collides with air passing there. The swirl can maximize the collision cooling effect.

Figure 11:
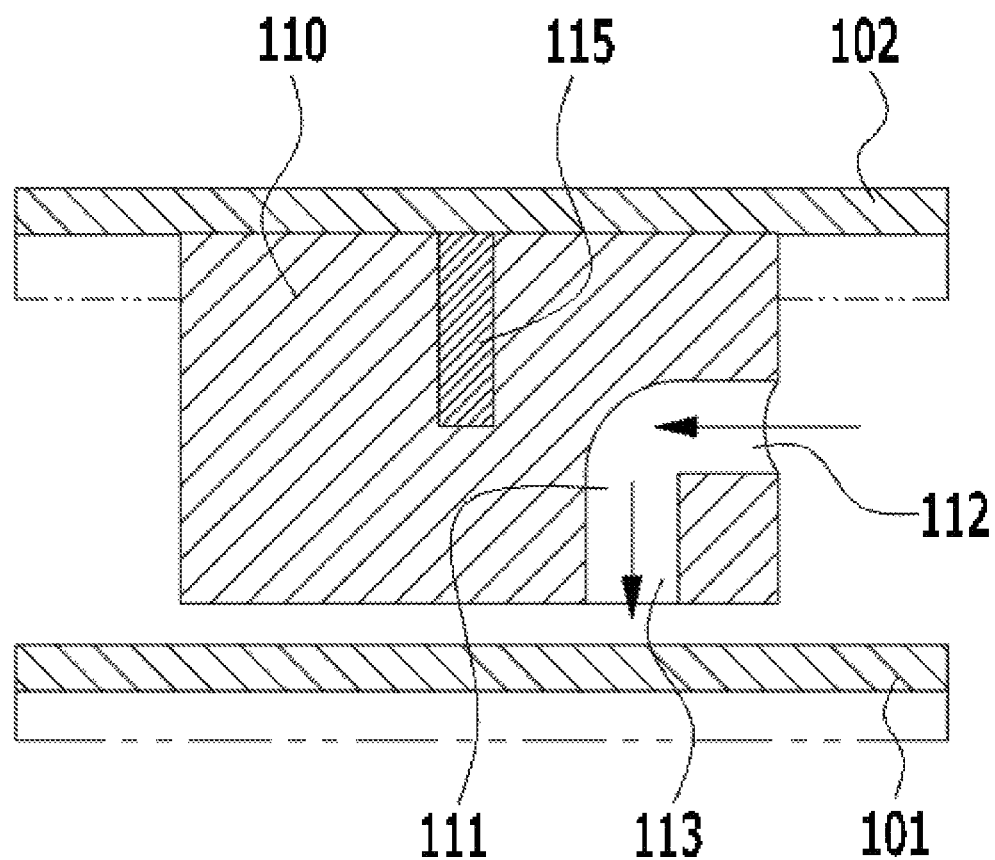
FIG. 11 is a sectional view of a flow guide of a combustor according to another embodiment of the present invention.

FIG. 11 illustrate a flow guide according to still another embodiment of the present invention.

Referring to FIG. 11, the flow guide 110 may be rotatably mounted on the inner surface of the outer casing 102 such that the flow guide is rotatable by a predetermined angle by means of a hinge structure 115. Optionally, the flow guide 110 may be detachably mounted on the inner surface of the outer casing 102.

In this case, the cross-sectional structure of the flow guide 110 preferably has an airfoil structure extending in a direction corresponding to the direction of the combustion air flowing through the space between the inner casing 101 and the outer casing 102.

The mounting direction of the flow guide 110 having such a structure can be intrinsically changed according to the flow of the combustion air through the space between the inner casing 101 and the outer casing 102. Here, the flow guide 110 in which the mounting direction is varied according to the flow direction of the combustion air can introduce a large amount of air through the channel inlet 112 so that a greater amount of air can be discharged through the channel outlet 113. As a result, the collision cooling effect can be maximized.

The present invention can provide a gas turbine including the above-described combustor in which the difference between the direction of the air flow and the direction of the fuel flow is reduced so that the fuel is supplied to a desired region, thereby improving the fuel-air mixing ratio and thus the performance of the combustor.

Specifically, a gas turbine according to the present embodiment includes a compressor 1100 to compress air introduced from an outside; a combustor 1200 to produce combustion gas by combusting a mixture of fuel and the compressed air; and a turbine 1300 to produce power using the combustion gas. Here, the combustor 1200 may include the combustor according to any one of the above-described embodiments of the present invention.

As described before, the combustor of the present invention is provided with the flow guide in which the guide channel having a specific structure is installed, thereby providing a structure capable of simultaneously implementing collision cooling and convection cooling for cooling the combustor liner and the transition piece.

While the exemplary embodiments of the present invention have been described in the detailed description, the present invention is not limited thereto, but should be construed as including all of modifications, equivalents, and substitutions falling within the spirit and scope of the invention defined by the appended claims.

That is, the present invention is not limited to the above-mentioned embodiments and the description thereof, and it will be appreciated by those skilled in the art that various modifications and equivalent embodiments are possible without departing from the scope and spirit of the invention defined by the appended claims and that the present invention covers all the modifications and equivalents falling within the spirit and the scope of the present invention as defined by the appended claims.

What is claimed is:

1. A combustor comprising:
an air channel formed by an inner casing and an outer casing which are spaced apart from each other by a predetermined distance, through which combustion air is introduced to the combustor in order to produce a fuel-air mixture; and
a flow guide attached to an inner surface of the outer casing and extending a predetermined length towards the inner casing so as to guide the combustion air flowing through the air channel toward an outer surface of the inner casing, the flow guide including:
a channel inlet formed so as to face in a direction of the combustion air flowing through the air channel;
a channel outlet formed on a lower surface of the flow guide facing the inner casing, the lower surface having a curved structure recessed by a predetermined depth towards the outer casing, the curved structure including an upstream end, a downstream end, and a concave surface extending between the upstream and downstream ends and facing the outer surface of the inner casing; and
a guide channel communicating with each of the channel inlet and the channel outlet,
wherein the curved structure is disposed such that the upstream and downstream ends are arranged in the direction of the combustion air flowing through the air channel and is configured to pass the combustion air along the concave surface, and
wherein the channel outlet of the flow guide communicates with the concave surface of the curved structure and is configured to generate swirl along the curved structure when the combustion air flowing in the guide channel collides with the combustion air passing the curved structure.

2. The combustor of claim 1, wherein the guide channel has a curved shape with a predetermined radius of curvature connecting the channel inlet and the channel outlet with each other.

3. The combustor of claim 1, wherein the channel outlet is comprised of two or more channel outlets respectively communicating with the guide channel.

4. The combustor of claim 1,
wherein the guide channel is comprised of two or more guide channels, and
wherein the channel inlet is comprised of two or more channel inlets communicating with the two or more guide channels, respectively.

5. The combustor of claim 1, wherein the channel outlet is comprised of a plurality of channel outlets, and the channel inlet is comprised of a plurality of channel inlets; and wherein the plurality of channel outlets and the plurality of channel inlets communicate with each other, respectively.

6. The combustor of claim 1, wherein the lower surface of the flow guide has a structure corresponding to the outer surface of the inner casing and is spaced apart from the outer surface of the inner casing by a predetermined distance.

7. The combustor of claim 1, wherein the channel outlet is comprised of a plurality of micro-channels respectively communicating with the guide channel.

8. The combustor of claim 7, wherein the channel outlet occupies 50% to 90% of the lower surface of the flow guide.

9. The combustor of claim 1, wherein the flow guide is detachably mounted on the inner surface of the outer casing.

10. The combustor of claim 1, wherein the flow guide is mounted on the inner surface of the outer casing and is configured to rotate at a predetermined angle about a hinge.

11. The combustor of claim 10, wherein the flow guide has a cross-sectional structure formed as an airfoil structure extending in a direction corresponding to the direction of the combustion air flowing through the air channel.

12. The combustor of claim 1, wherein the flow guide has a cross-sectional structure formed as any one of a circular, oval, or airfoil structure extending in a direction corresponding to the direction of the combustion air flowing through the air channel.

13. A gas turbine comprising a compressor to compress air introduced from an outside; a combustor to produce combustion gas by combusting a mixture of fuel and the compressed air; and a turbine to produce power using the combustion gas,
wherein the combustor comprises:
an air channel formed by an inner casing and an outer casing which are spaced apart from each other by a predetermined distance, through which the compressed air is introduced to the combustor; and
a flow guide attached to an inner surface of the outer casing and extending a predetermined length towards the inner casing so as to guide the compressed air flowing through the air channel toward an outer surface of the inner casing, the flow guide including:
a channel inlet formed so as to face in a direction of the compressed air flowing through the air channel;
a channel outlet formed on a lower surface of the flow guide facing the inner casing, the lower surface having a curved structure recessed by a predetermined depth towards the outer casing, the curved structure including an upstream end, a downstream end, and a concave surface extending between the upstream and downstream ends and facing the outer surface of the inner casing; and
a guide channel communicating with each of the channel inlet and the channel outlet,
wherein the curved structure is disposed such that the upstream and downstream ends are arranged in the direction of the compressed air flowing through the air channel and is configured to pass the compressed air along the concave surface, and
wherein the channel outlet of the flow guide communicates with the concave surface of the curved structure and is configured to generate swirl along the curved structure when compressed air flowing in the guide channel collides with the compressed air passing the curved structure.

\* \* \* \* \*